(12) United States Patent
Andreev et al.

(10) Patent No.: US 11,615,647 B1
(45) Date of Patent: Mar. 28, 2023

(54) SYSTEMS AND METHODS FOR EYE TRACKING WITH SPATIALLY VARYING K-VECTORS

(71) Applicant: Meta Platforms Technologies, LLC, Menlo Park, CA (US)

(72) Inventors: Gregory Olegovic Andreev, Kirkland, WA (US); Gang Li, Bothell, WA (US); Changwon Jang, Bellevue, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 16/696,776

(22) Filed: Nov. 26, 2019

(51) Int. Cl.
*G06V 40/19* (2022.01)
*G02B 5/18* (2006.01)
*H04N 5/33* (2006.01)
*G03H 1/02* (2006.01)

(52) U.S. Cl.
CPC .......... *G06V 40/19* (2022.01); *G02B 5/1861* (2013.01); *H04N 5/33* (2013.01); *G03H 1/0248* (2013.01); *G03H 2260/10* (2013.01); *G03H 2260/12* (2013.01); *G03H 2260/14* (2013.01); *G03H 2260/16* (2013.01); *G03H 2260/54* (2013.01)

(58) Field of Classification Search
CPC .... G06K 9/00604; H04N 5/33; G03H 1/0248; G03H 2260/14; G03H 2260/16; G03H 2260/54; G03H 2260/10; G03H 2260/12; G02B 5/1861; G06V 40/19
See application file for complete search history.

(56) References Cited

U.S. PATENT DOCUMENTS

| | | | |
|---|---|---|---|
| 9,658,453 B1* | 5/2017 | Kress | G02B 27/4244 |
| 2006/0228073 A1* | 10/2006 | Mukawa | G02B 17/0856 385/31 |
| 2016/0041384 A1* | 2/2016 | Robbins | G06F 3/013 345/156 |
| 2017/0373459 A1* | 12/2017 | Weng | G02B 30/25 |
| 2020/0166756 A1* | 5/2020 | DeLapp | G02B 6/0016 |
| 2020/0174255 A1* | 6/2020 | Hollands | G02B 5/189 |

* cited by examiner

*Primary Examiner* — Michael E Teitelbaum
(74) *Attorney, Agent, or Firm* — Foley & Lardner LLP

(57) ABSTRACT

Systems and method for eye tracking are provided. In some embodiments, the eye tracking system includes a light source configured to generate light and project the light toward an object in a field of view, a detector configured to receive reflected portions of the light from the field of view in order to image the object, and a combiner including a volume grating configured to direct light reflected from different points in a field of view to the light detector. The volume grating includes a plurality of portions along a first area and each of the portions comprising a unique k-vector that is dependent on a respective portion of the field of view.

20 Claims, 10 Drawing Sheets

SYSTEMS AND METHODS FOR EYE TRACKING WITH SPATIALLY VARYING K-VECTORS

FIELD OF THE DISCLOSURE

The present disclosure relates generally to systems and methods used to sense and/or measure position of eye. More particularly, the present disclosure relates to systems and methods for eye tracking.

BACKGROUND

The present disclosure relates generally to eye tracking systems. Eye tracking systems can be used to detect and measure the location, size, position, movement, and gaze angle of an observer's eye. For example, a wearable device such as a headset may include an eye tracking system that is able to detect and measure the size of the observer's pupil, the location of the eye, and the angle of the eye which the observer is gazing. The detections and measurements can be used in various ways. For example, the measurements can be used to process an image the observer is viewing.

SUMMARY

Various aspects of the present disclosure relate to systems and methods for eye tracking. In one embodiment, a wearable device may include a light source configured to generate light and project the light into an eyebox of the wearable device, a detector configured to receive light from an optical element for eye tracking. The optical element includes a volume grating, the volume grating configured to direct light from portions of the eyebox within a field of view to the detector, the volume grating comprising a plurality of portions along a first area, each of the portions comprising a unique k-vector that is dependent on a respective portion of the field of view.

In some embodiments, a first portion along the first area comprises a first k-vector, a second portion along the first area comprises a second k-vector, and a third portion along the first area comprises a third k-vector. In some embodiments, the first portion, the second portion, and the third portion each have a refractive index. In some embodiments, the first portion, the second portion, and the third portion each have a unique grating periodicity. In some embodiments, the first portion has a Bragg matching condition at a first incident angle of a first impinging light relative to the optical element in the field of view, the second portion has a Bragg matching condition at a second incident angle of a second impinging light relative to the optical element in the field of view, and the third portion has a Bragg matching condition at a third incident angle of a third impinging light relative to the optical element in the field of view, wherein Bragg matching condition comprises a diffraction efficiency above eighty percent. In some embodiments, the first impinging light, second impinging light, and third impinging light are at substantially the same wavelength. In some embodiments, the first incident angle, the second incident angle, and the third incident angle have different magnitudes.

In some embodiments, the k-vectors along the first area are designed to maximize, improve, or optimize the diffraction efficiency over the entire field of view or selected portions of the field of view (e.g., portions that will likely include an object of interest such as an eye). In some embodiments, the k-vectors along the first area are designed to reduce the aberration in images of elements within the field of view. In some embodiments, the k-vectors along the first area are designed to induce optical power in images of elements within the field of view.

In another embodiment, a system for eye tracking includes a light source configured to generate light and project the light toward an object in a field of view, a detector configured to receive reflected portions of the light from the field of view in order to image the object, and a optical element that includes a volume grating configured to direct light reflected from different points in a field of view to the light detector. The volume grating includes a plurality of portions along a first area where each of the portions comprising a unique k-vector that is dependent on a respective portion of the field of view.

In some embodiments, a first portion along the first area of the optical element comprises a first k-vector, a second portion along the first area of the optical element comprises a second k-vector, and a third portion along the first area of the optical element comprises a third k-vector. In some embodiments, the first portion of the optical element has a Bragg matching condition at a first incident angle of a first impinging light relative to the optical element in the field of view, the second portion of the optical element has a Bragg matching condition at a second incident angle of a second impinging light relative to the optical element in the field of view, and the third portion of the optical element has a Bragg matching condition at a third incident angle of a third impinging light relative to the optical element in the field of view. In some embodiments, the volume grating includes a plurality of grating elements having unique k-vectors along a first area, wherein each of the plurality of k-vectors along the first area are dependent on a respective portion of a field of view such that light reflected off an object at different points of the object in the field of view is reflected from the optical element with a diffraction efficiency above eighty percent.

In some embodiments, a first portion along the first area of the optical element comprises a first k-vector, a second portion along the first area of the optical element comprises a second k-vector, and a third portion along the first area of the optical element comprises a third k-vector. In some embodiments, the optical element includes photopolymer, dichromated gelatin, silver halide, photorefractive crystal, or photoresist materials. In some embodiments, the first area is polarized.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component is labeled in every drawing. In the drawings.

DETAILED DESCRIPTION

Figure 1:
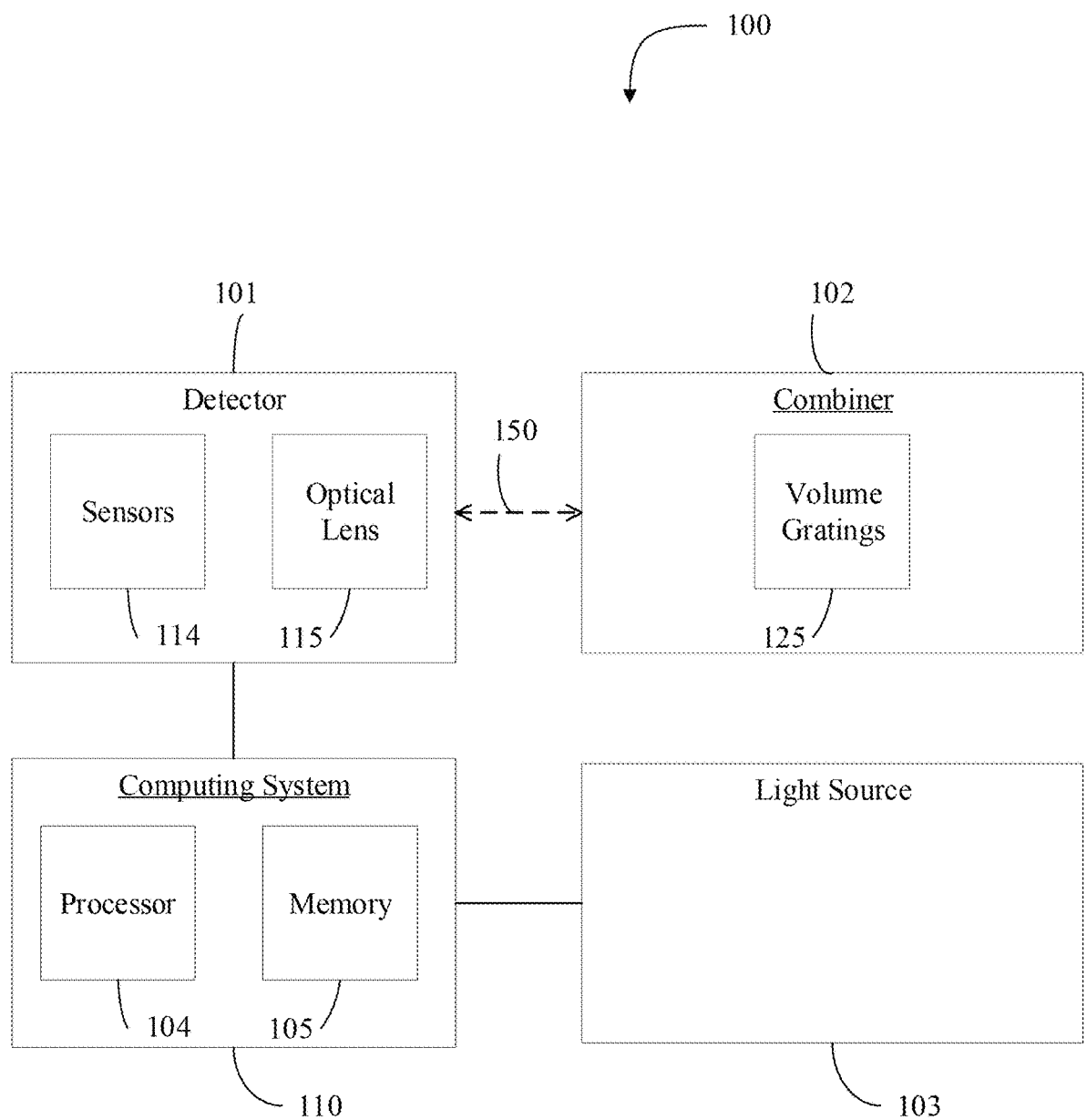
FIG. 1 is a general block diagram of an eye tracking system in accordance with an illustrative embodiment.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Embodiments relating to eye tracking systems are disclosed herein. More particularly, embodiments related to off-axis eye tracking systems are disclosed. Eye tracking systems can be used within wearable devices (e.g., head mounted devices, head-word displays etc.), or other electronic devices, such as mobile devices, gaming devices, etc. In some embodiments, the electronic device may be part of a virtual reality (VR) system, an augmented reality (AR) system, a mixed reality (MR) system, or a combination thereof. Off axis eye tracking systems are positioned off the axis of an eye of user such that the user's view or sight is not disturbed. The eye tracking system includes a light source (e.g., illuminator), a detector (e.g., a sensor), and an optical element. The light source generates a light (e.g., infrared light) and projects the light toward into an environment (e.g., toward an eye of a user). The light reflects from objects located within the environment toward the optical element. The optical element receives the reflected light from objects in a field of view (FOV) and transmits or reflects the light to the detector. The detector then creates an electrical signal that is indicative of the objects in the FOV and transmits the electrical signal to a processor.

The optical element includes one or more diffraction gratings (e.g., volume gratings) that diffract or reflect the received light with a diffraction efficiency (DE) that is dependent on the k-vector of the one or more diffraction gratings of optical element. The k-vector is defined as a vector perpendicular to the grating fringes and accounts for the diffraction efficiency and the angle characteristics of the grating (e.g., incident angle and diffraction angles that have a peak diffraction efficiency). The magnitude of the k-vector is inversely proportional to the periodicity of the gratings (e.g., grating period). The angle of the k-vector is dependent on the slant angle of the grating. A diffraction grating that has a uniform k-vector throughout the optical element results in the optical element having a DE that is spatially dependent. That is, the DE of the diffraction grating that has a uniform k-vector will have limited angular bandwidth within the FOV. Objects that do not fall within the limited band of the FOV will not have scattered light that is efficiently reflected or diffracted to the detector, resulting in poor image quality. Thus, an optical element that has one or more diffraction gratings with varying k-vectors that are dependent on different portions of the FOV is advantageous for improving imaging quality. In some embodiments, by tuning the k-vectors (e.g., by changing the slant angle of the gratings or changing the periodicity of the gratings) based on spatial portions of the FOV, the eye tracking system increases the DE over the entire FOV, reduces aberrations in resulting images, and/or induces optical power (e.g., magnification or minimization) on portions of the FOV. In some embodiments, the optical element may be a combiner, be a part of a combiner or attached to a combiner. The combiner may combine real world source light with generated source light, such as for example combining light generated by a wearable device (e.g. HMD 1000) with real world light. In some embodiments, the combiner may be a waveguide combiner, a holographic combiner, or any other suitable optical element that combines light from more than one source.

Referring now to FIG. 1, a block diagram an eye tracking system 100 is depicted in accordance with an illustrative embodiment. The eye tracking system 100 includes a detector 101, a optical element 102, and a light source 103. In some embodiments, the eye tracking system 100 may include a processor 104 and a memory 105. In some embodiments, the processor 104 and memory may be shared by multiple systems within an electronic device (e.g., AR, VR, or MR device) that the eye tracking system 100 is integrated with. The processor 104 is connected to the detector 101 and configured to receive electrical signals generated by the detector 101 in response to light impinging upon the detector 101. The processor 104 may then process the electrical signals to generate an image indicative of the light received at the detector 101.

The light source 103 is positioned within the eye tracking system 100 such that light generated from the light source is projected toward the environment and reflected off objects within the environment to the optical element 102. In some embodiments, the light source 103 may be an IR light source and include one or more IR emitters. In some embodiments, the light source 103 includes an infrared light emitting diode (LED) or laser. In some embodiments, the light source 103 emits a light around a predetermined wavelength. In some embodiments, the light source 103 is capable of emitting a light within a range of wavelengths.

The detector 101 is positioned within the eye tracking system 100 such that light reflected from the environment to the optical element 102 is reflected or diffracted to or toward the detector 101. In some embodiments, the detector 101 may be any type of thermal or photonic detector. In some embodiments, the detector 101 may be an infrared (IR) camera or an IR position sensitive detector (PSD). In some embodiments, the detector 101 may be a camera that includes an optical lens) that is capable of focusing light received at the optical lens onto sensors of the camera.

The optical element 102 is positioned within the eye tracking system 100 such that light reflected off objects within a field of view (FOV) of the environment is reflected to or toward a first surface (e.g., first area) of the optical element 102. The optical element 102 includes one or more volume gratings 125. The volume gratings 125 have portions or structures having k-vectors designed to improve, optimize and/or maximize the diffraction efficiency (DE) of the reflected light over the entire or selected portions of the field of view, reduce aberrations in the resulting images of the FOV, and/or induce optical power on portions of the FOV. In some embodiments, the one or more volume gratings are a reflective-type volume gratings, diffractive-type volume gratings, etc. In some embodiments, the k-vectors along the first area are continuously changing over a first axis (e.g., length) and a second axis (e.g., height) of the first surface (e.g., along the first area). In some embodiments, the first surface (e.g., first area) includes discrete portions where each discrete portion has a different k-vector. In some embodiments, only a single grating 125 is included with the optical element 102 and the single gratings has multiple subsets of portions, fins, grooves, or holographic elements with different k-vectors.

Figure 2:
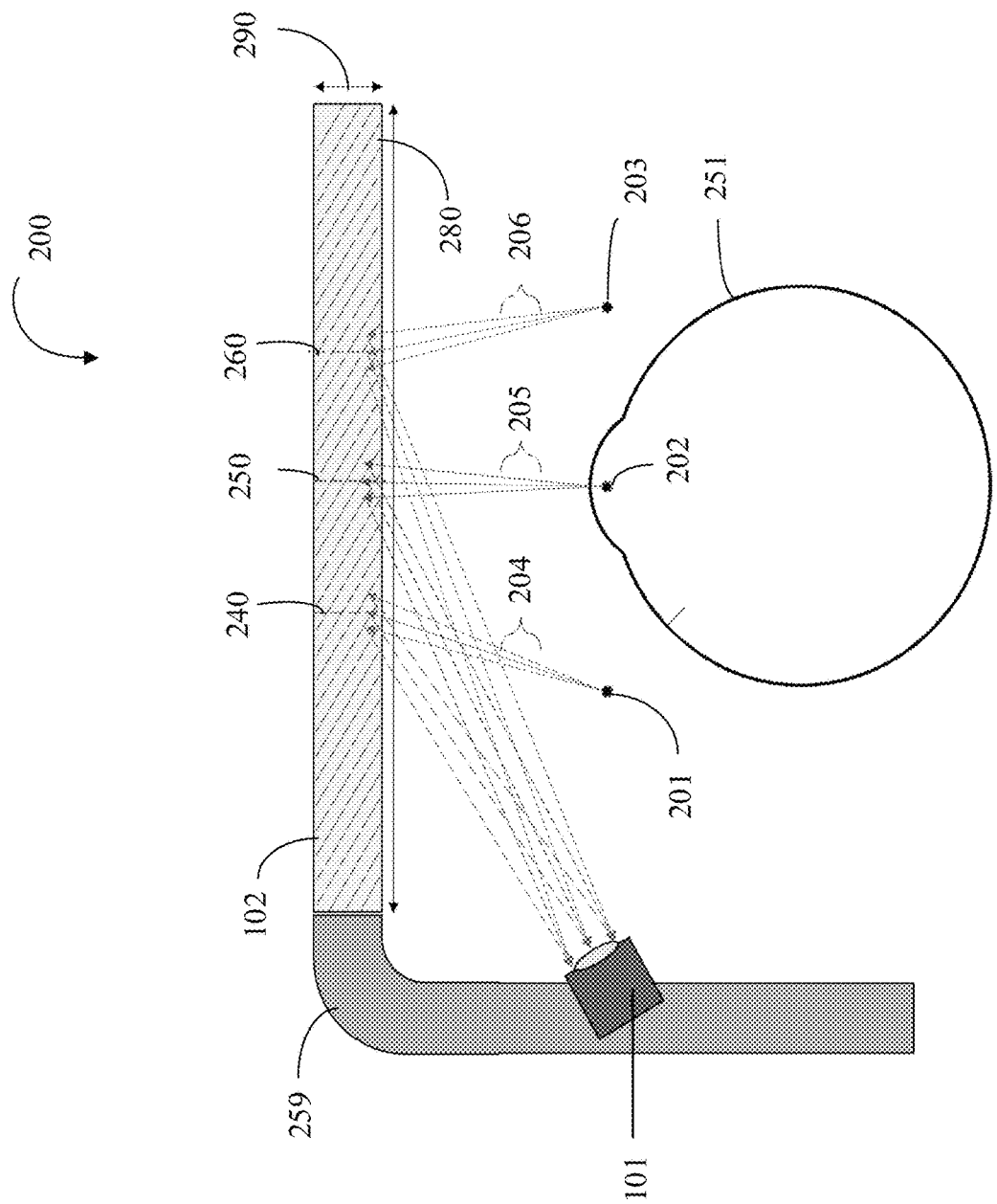
FIG. 2 is a ray diagram of an eye tracking system showing a partial top view of the eye tracking system illustrated in FIG. 1 in accordance with an illustrative embodiment.

Referring now to FIG. 2, an eye tracking system 200 is depicted in accordance with an illustrative embodiment. Reference to FIG. 1 may be made during the discussion of FIG. 2 for purposes of demonstration. The eye tracking system 200 includes a detector 101, a light source, and the optical element 102. In some embodiments, the detector 101, the light source, and the optical element 102 may be mounted to a frame 259. The frame 259 may be part of a virtual reality, augmented reality, or mixed reality system, such as any of the embodiments of FIG. 10. In some embodiments, the detector 101, the light source, and the optical element 102 may be housed within a housing. In some embodiments, the housing is configured to be attached to the head of a user. In some embodiments, a distance between an object being measured (e.g., an eye 251 of a user) and the optical element is under 4 inches.

For purposes of demonstration, a first point 201, a second point 202, and a third point 203 are depicted within a FOV of the eye tracking system 200. The FOV of the eye tracking system 200 is defined as the observable area of the eye tracking system 200. For example, the FOV includes all areas were light that impinges upon the optical element can be diffracted or reflected to the detector 101 with a diffraction efficiency above 30 percent. The first point 201 includes a first ray bundle 204 (e.g., the scattered light reflected from the point toward the optical element 102). The first ray bundle 204 impinges upon a first portion 240 on a first area 280 (e.g., the surface facing the object) of the optical element 102 and is diffracted or reflected to the detector 101. The second point 202 includes a second ray bundle 205 that impinges upon a second portion 250 along the first area 280 of the optical element 102 and is diffracted or reflected to the detector 101. The third point 203 includes a third ray bundle 206 (e.g., light scattered from the third point 203) that impinges upon a third portion 260 via the surface facing the object 251 (e.g., the first area 280) of the optical element 102 and is diffracted or reflected to the detector 101. It is to be appreciated that this explanation is by way of example only and that a light illuminated from a light source would be scattered from various points of the user's eye 251 and head and directed to the detector 101.

The first portion 240 is where the ray bundle 204 from the first point is reflected to the detector with a peak diffraction efficiency. That is, the incident angle of the first ray bundle 204 at the optical element 102 at the first portion 240 is such that the one or more of the rays of the first ray bundle 204 can be reflected at a diffraction angle that allows the detector 101 to image the first point 201. Similarly, the incident angle of the second ray bundle 205 at the second portion 250 is such that one or more rays of the second ray bundle 205 can be reflected at a diffraction angle and received by the detector 101. Further, the incident angle of the third ray bundle 206 at the third portion 260 is such that one or more rays of the third ray bundle 206 can be reflected at a diffraction angle and received by the detector 101. In other words, the first, second, and third portions 240, 250, and 260 are the only portions where light scattered from the first, second, and third points 201, 202, and 203 will be directed to the detector 101 with a detectable diffraction efficiency (e.g., a diffraction efficiency above 30% or more). However, the ray bundles 204, 205, and 206 will reflect to the detector 101 with different magnitudes of diffraction efficiency that are dependent on the k-vectors at the first, second, and third portions 240, 250, and 260, respectively. This is due to the Bragg angle selectivity of the optical element 102. The Bragg angle selectivity of the optical element 102 is defined by the change in angles that the incident beam may be at a particular wavelength before the diffraction efficiency drops below acceptable magnitude. The Bragg angle selectivity is dependent upon a thickness 290, refractive index of the optical element 102, and/or the modulated refractive index of the volume gratings of the optical element 102.

Figure 3:
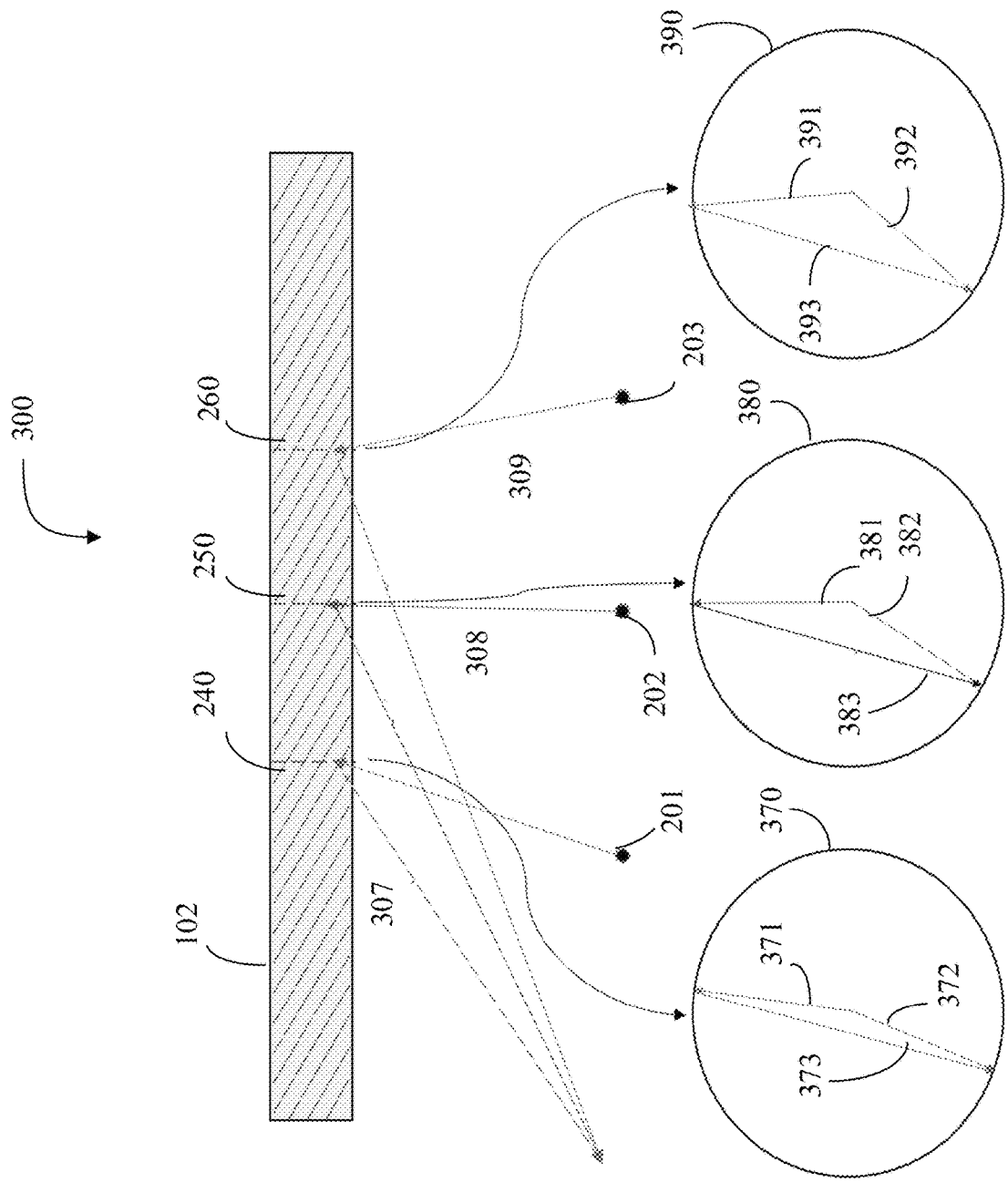
FIG. 3 depicts a ray diagram with vector diagrams in accordance with an illustrative embodiment.

FIG. 3 is a ray diagram of an eye tracking system 300 in accordance with an illustrative embodiment. For purposes of demonstration, reference to FIGS. 1 and 2 may be made in reference to the discussion of FIG. 3. The ray diagram of the eye tracking system 300 depicts an optical element 102, the first point 201, the second point 202, and the third point 203 within the FOV. For purposes of demonstration, the first, second, and third ray bundles 204, 205, and 206 are represented as single first, second, and third rays 307, 308, and 309, respectively. The ray diagram 300 also includes a first vector diagram 370 corresponding to the first ray 307, a second vector diagram 380 corresponding to the second ray 308, and a third vector diagram 390 corresponding to the third ray 309. In some embodiments, the first, second, and third rays (e.g., all rays from all points in the field of view) have the same wavelength.

The first ray 307 impinges on the first portion 240 at an incident angle that is shown as an incident vector 371 within the first vector diagram 370 and is diffracted at a diffraction angle toward the detector (not depicted) depicted as a diffraction vector 372. In order for the first ray 307 to have Bragg matching conditions (and thereby have a diffraction efficiency above 80 percent), a first k-vector 373 of diffraction elements (e.g., volume gratings) at the first portion 240 should be equal to the incident vector 371 minus the diffraction vector 372. Similarly, the second ray 308 impinges on the second portion 250 at an incident angle that is shown as an incident vector 381 within the second vector diagram 380 and is diffracted at a diffraction angle toward the detector (not depicted) shown as a diffraction vector 382. In order for the diffracted second ray 308 to have Bragg matching conditions, a second k-vector 383 of diffraction elements at the second portion 250 should be equal to the incident vector 381 minus the diffraction vector 382. Lastly, the third ray 309 impinges on the second portion at an incident angle that is shown as an incident vector 391 within the third vector diagram 390 and is diffracted at a diffraction angle toward the detector (not depicted) depicted as a diffraction vector 392. In order for the diffracted third ray 309 to have Bragg matching conditions, a third k-vector 393 of diffraction elements at the third portion 260 should be equal to the incident vector 391 minus the diffraction vector 392. Thus, since the incident vectors and the diffraction vectors are different (e.g., the incident angles) for each point

201, 202, and 203, the first, second, and third k-vectors 373, 383, and 393 should also be different in order for rays from the points 201, 202, and 203 to be diffracted under Bragg matching conditions. Further, by having Bragg matching at all points (or selective points) throughout the FOV ensures that the detector 101 is able to image the FOV (or desired portions of the FOV) with a greater resolution since over 80 percent of the light rays from each point in the FOV will be reflected to the detector. It is to be appreciated that FIG. 3 is by way of example, and that all points within the FOV will need to be reflected with Bragg matching or close to Bragg matching conditions in order to image the FOV with an optimal resolution. The k-vectors of each portion of the diffraction elements of the optical element 102 are spatially varying k-vectors (e.g., they are selected to only diffract rays to the detector from particular incident angles (e.g., and thereby points along that incident angle) within the FOV in some embodiments.

In some embodiments, the magnitude of the k-vector can be changed by changing the periodicity of the gratings at respective portions of the optical element 102. In some embodiments, the k-vector can be changed by changing the slant angle of the gratings at respective portions of the gratings. In some embodiments, the Bragg angular selectivity (e.g., angular bandwidth) of respective portions (or the entire optical element 102) may be increased by increasing the thickness or refractive index of the optical element 102. By increasing the Bragg angular selectivity, the optical element can act as a filter and diffract rays with particularity from particular angles (e.g., points) within the FOV. In some embodiments, the optical element 102 has Bragg angular selectivity that is less than 5 degrees. In some embodiments, the optical element 102 has Bragg angular selectivity that is within the range of 2-5 degrees. In some embodiments, the optical element 102 may include one or more optical elements that are mechanically coupled together. The one or more optical elements may have each have different grating periodicities, grating slant angles, average refractive indexes, or modulated refractive indexes such that the optical element 102 has multiple spatially varying k-vectors that are able to diffract rays scattered from respective, selected portions of the FOV with Bragg matching conditions.

In some implementations, the magnitude and angle of the k-vector will be selected depending on the particular device used. For example, an eye tracking system that has a typical eye location 4 inches from the optical element 102 may have grating elements with different spatially varying k-vectors than an eye tracking system that has a typical eye location 12 inches from the optical element 102. Further, the spatially varying k-vectors (e.g., the diffracting elements) may be different depending on the length of the optical element 102. In some embodiments, the spatially varying k-vectors may be selected to reduce aberrations in one or more portions of the image of the FOV. In some embodiments, the spatially varying k-vectors may be selected to induce optical power (e.g., magnification or demagnification) on one or more portions of the image. For example, the optical element may have diffraction elements that induce different optical power along a first and second (e.g., horizontal and vertical) axis (e.g., of the first area 280) in order to reduce the aberration of images. In some embodiments, the k-vectors are spatially varying only along a first axis (e.g., horizontal axis or vertical axis) of the optical element. In some embodiments, the k-vectors are spatially varying along both a first and second axis (horizontal and vertical axis) of the first area 280 of the optical element 102.

In some embodiments, a portion or all of the optical element 102 may be polarized. In some embodiments, the optical element 102 or a portion of the optical element may right circular polarized or left circular polarized. In some embodiments, the optical element 102 is formed as a curved surface. In some embodiments, the optical element 102 is formed with a flat surface as the first area 280. In some embodiments, the optical element 102 has a varying thickness along one or more axes. In some embodiments, the optical element 102 has a constant thickness and is hyper rectangular shaped. In some embodiments, the diffraction elements of the optical element 102 are made by exposing holographic recording materials to interference patters of a coherent wave signal (e.g., a recording beam). In some embodiments, the recording beam may be used to create the volume gratings (e.g., and thereby the spatially varying k-vectors) via various types of spatial light modulators including liquid crystal on silicon substrates, deformable mirrors, or acousto-optic modulators. In some embodiments, the optical element 102 can include photopolymer, dichromated gelatin, silver halide, photorefractive crystal, or photoresist materials.

Figure 4:
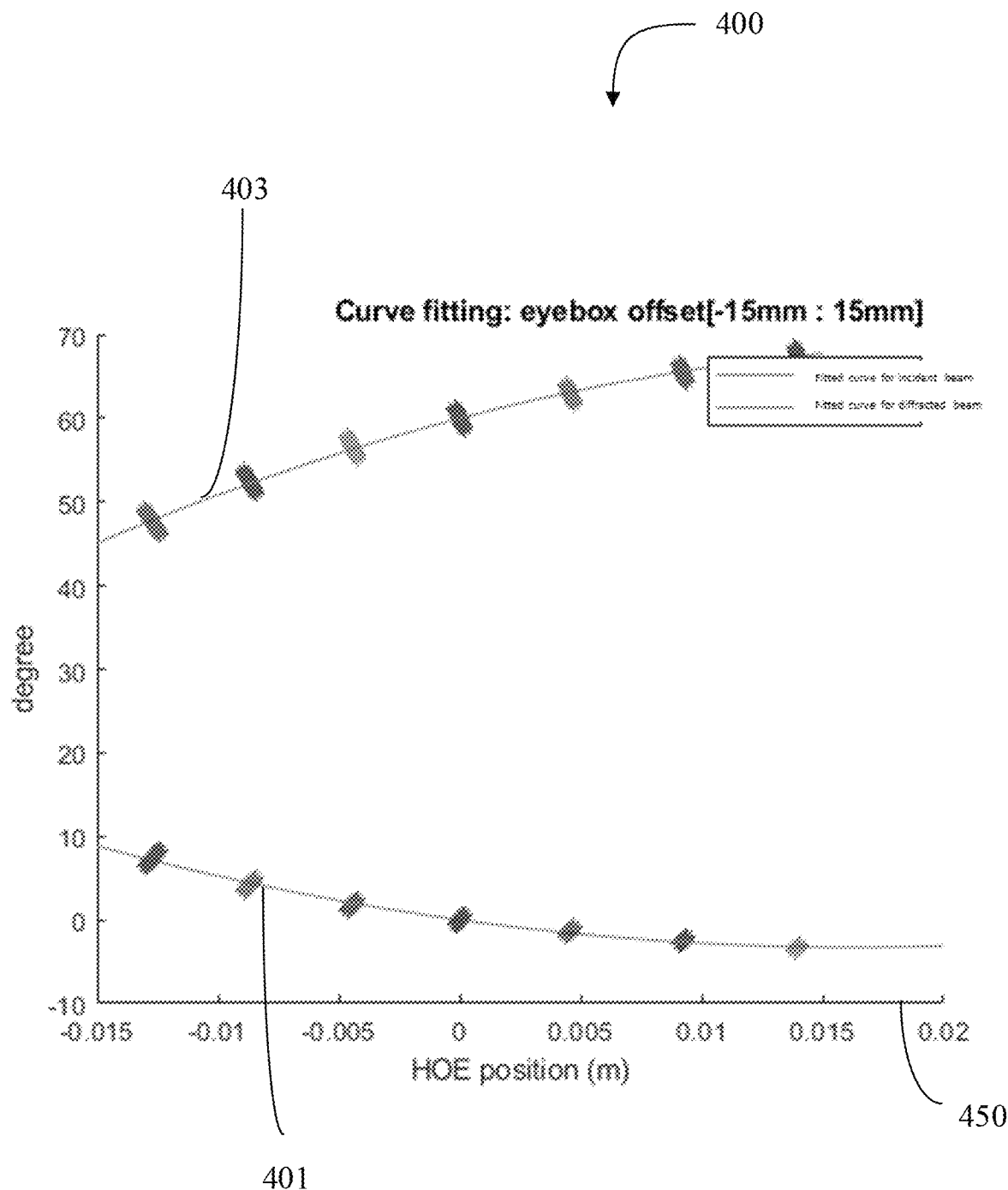
FIG. 4 depicts a spatially varying k-vector graph in accordance with an illustrative embodiment.
Figure 5:
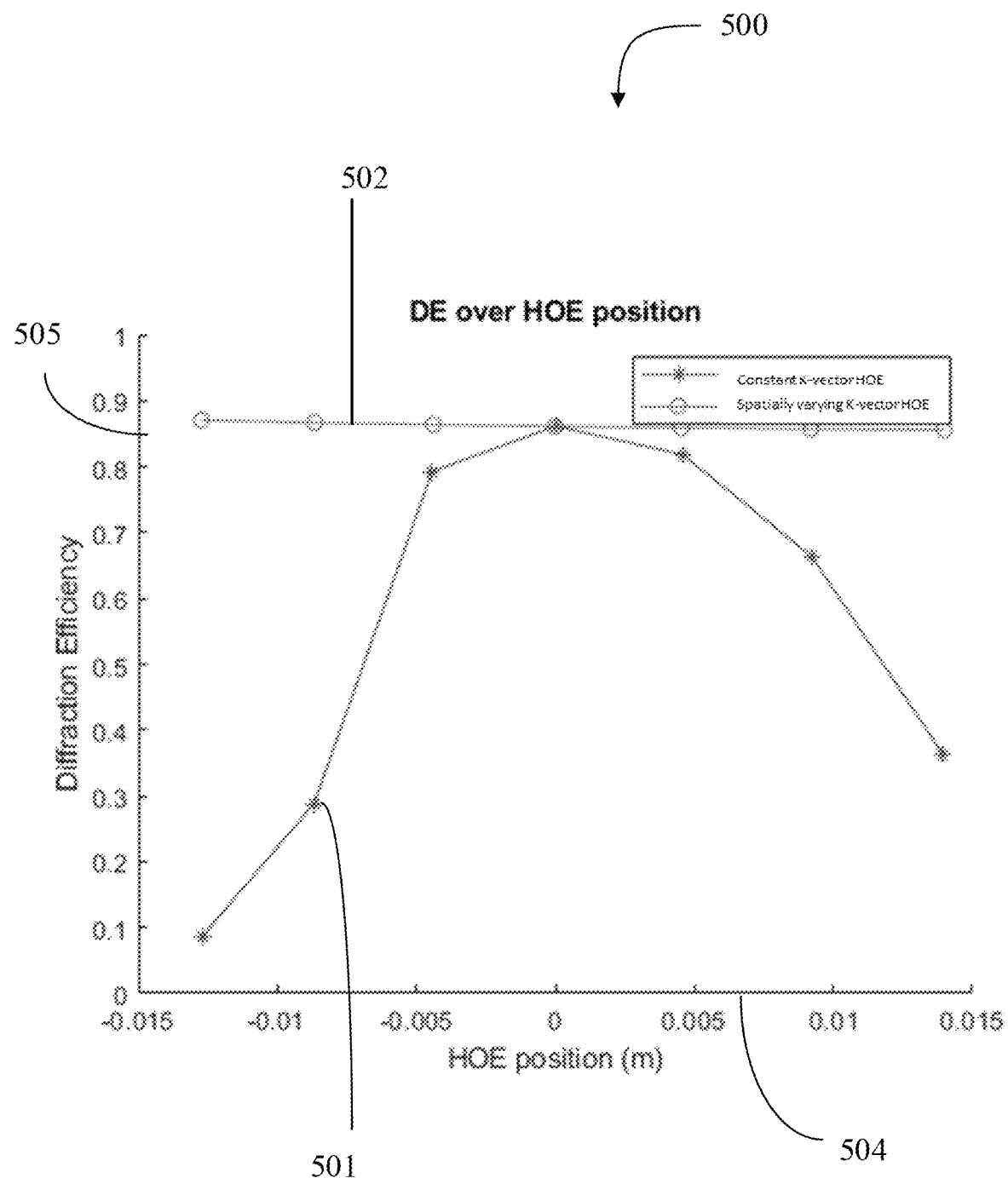
FIG. 5 depicts a diffraction efficiency graph in accordance with an illustrative embodiment.

FIG. 4 and FIG. 5 are referenced in tandem to depict some of the results of the eye tracking system. FIG. 4 depicts a graph 400 in accordance with an illustrative embodiment of one example of an optical element designed with specific angles of incidence and diffraction (e.g., k-vectors that allow for Bragg matching at the angles of incidence and diffraction) at particular positions on the combiner. The graph 400 depicts the angle of incidents of a light beam and the angle of diffraction of the light beam vs a position on a particular combiner 450 in an example eye tracking system. Particularly, the graph shows an angle of incidence 401 to various point along a first axis of the optical element and the angle of diffraction 403 from the respective point on the optical element in order for the detector to receive the light beam. For example, at a position 0 of the optical element (e.g., middle of the optical element), the optical element 102 is designed for Bragg matching conditions at the corresponding incidence and diffraction angles indicated on the graph 400.

FIG. 5 depicts a diffraction efficiency graph 500 in accordance with an illustrative embodiment. The diffraction efficiency graph 500 shows diffraction efficiency 505 vs. a position on the optical element 504. The diffraction efficiency graph 500 also includes results of diffraction efficiencies for a conventional optical element 501 (e.g., an optical element that has diffraction elements that have a constant k-vector throughout the optical element) and results of average diffraction efficiency for an optical element having diffraction elements that have a plurality of differing k-vectors 502 with each k-vector being spatially dependent. The diffraction efficiency graph 500 is for a light with a single wavelength impinging at a plurality of different positions along the optical element. As can be seen in the graph, the average diffraction efficiencies for a conventional optical element 501 has a peak at zero and then decreases on either side. Thus, the conventional optical element 501 has a limited bandwidth in measuring objects in the FOV. However, as can be seen by the average diffraction efficiency for an optical element having diffraction elements that exhibit a plurality of differing k-vectors 502 (e.g., such as the one designed for the incident and diffraction angles in FIG. 4), the diffraction efficiency over the optical element (and thereby the FOV) is held at over 85%.

Figure 6:
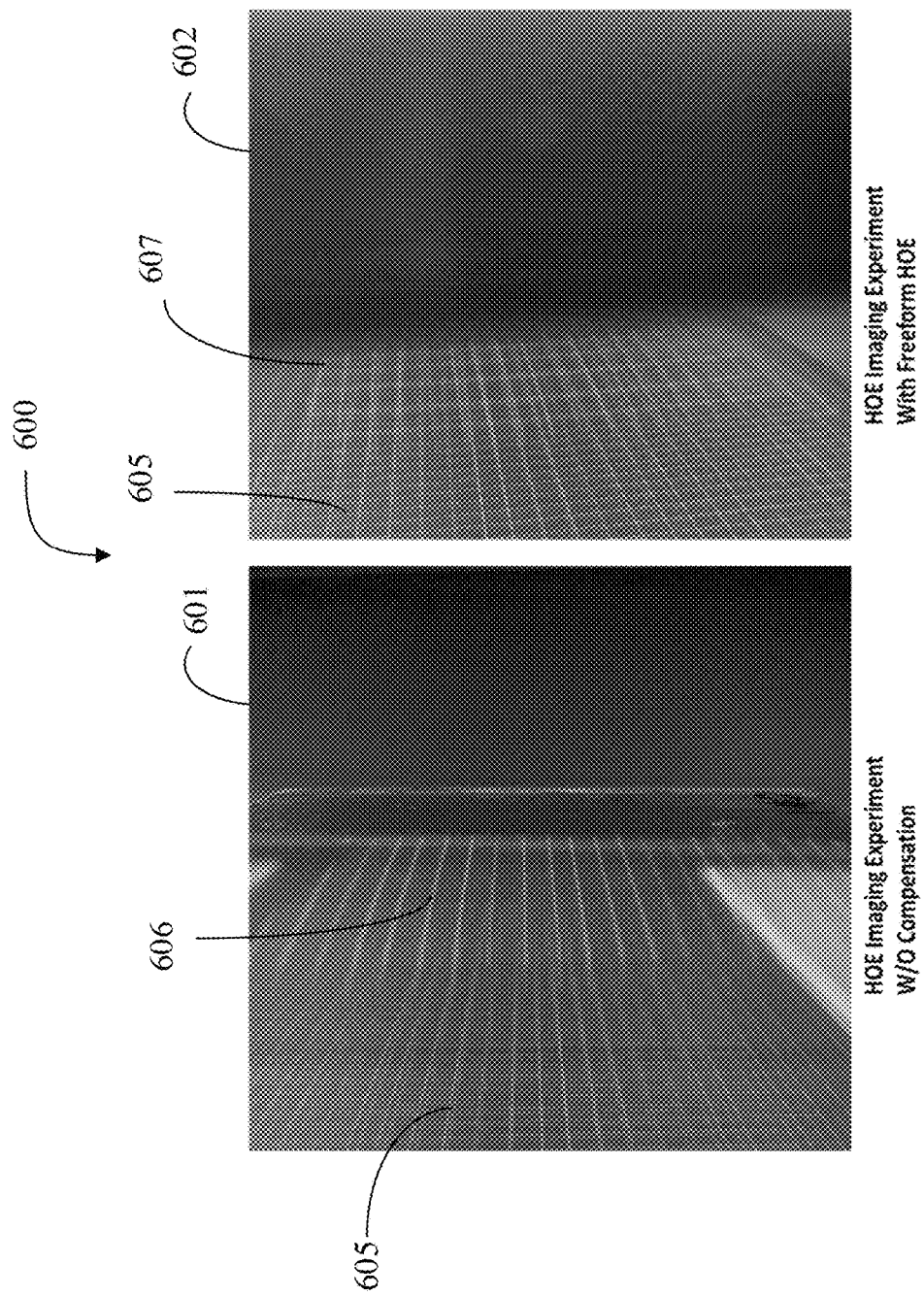
FIG. 6 depicts a before and after experimental result of aberration correction in accordance with an illustrative embodiment.

FIG. 6 depicts experimental results of aberration correction 600 using an optical element in accordance with an illustrative embodiment. Particularly, FIG. 6 depicts a first image 601 and a second image 602. The first image 601 includes a grid 605 and a first image of the grid 606 captured by an eye tracking system superimposed on one another. The first image of the grid 606 is the attempt by an eye tracking system that includes an optical element that does not have diffraction elements that have spatially varying k-vectors (e.g., an optical element with diffraction elements that have the same k-vector at every portion) to image the grid 605. The second image includes the grid 605 and a second image of the grid 607 captured by an eye tracking system superimposed on one another. The second image of the grid 607 is the image taken by an eye tracking system that includes an optical element that has diffraction elements that has spatially varying k-vectors. The first image of the grid 606 includes aberrations and does not accurately image the grid 605. The second image of the grid 605 reduces these aberrations and accurately images the grid 605. Accurate imaging may include multiple factors such as resolution, distortion, or magnification and the spatially selective k-vectors may be optimized in order to ensure that images are accurately imaged. For example, the first image of the grid 606 shows that the vertical line is blurred and only the horizontal lines are imaged due to aberrations mostly caused by astigmatism. In the example of the second image of the grid 606, the vertical line and horizontal lines of the grid are more accurately imaged due to the optimized spatial k-vectors that reduce the astigmatism and thereby the aberration.

The optical element that includes diffraction elements that have spatially varying k-vectors allows the grid to be images accurately. The spatially varying k-vectors both allow the optical element to maximize the diffraction efficiency over the entire FOV and allow the optical element to induce optical power (e.g., magnification or demagnification) to portions of the grid that are further away or very close. For example, when designing the optical element for a particular system or application (e.g., such as wearable glasses), the portions of the FOV that are likely going to include an object (e.g., an eye) for imaging will have substantially known distance and angle relative to the optical element. Thus, the optical element (portions of the diffraction elements and respective k-vectors) can be designed to induce optical power based on the substantially known position and orientation of the object in order to ensure the detector can accurately image the objects. It is to be appreciated that FIG. 6 is meant only by way of example and that the particular diffraction elements and thereby the spatially varying k-vectors will be dependent upon the particular application, orientation, and placement of the optical element and or detector.

Figure 7:
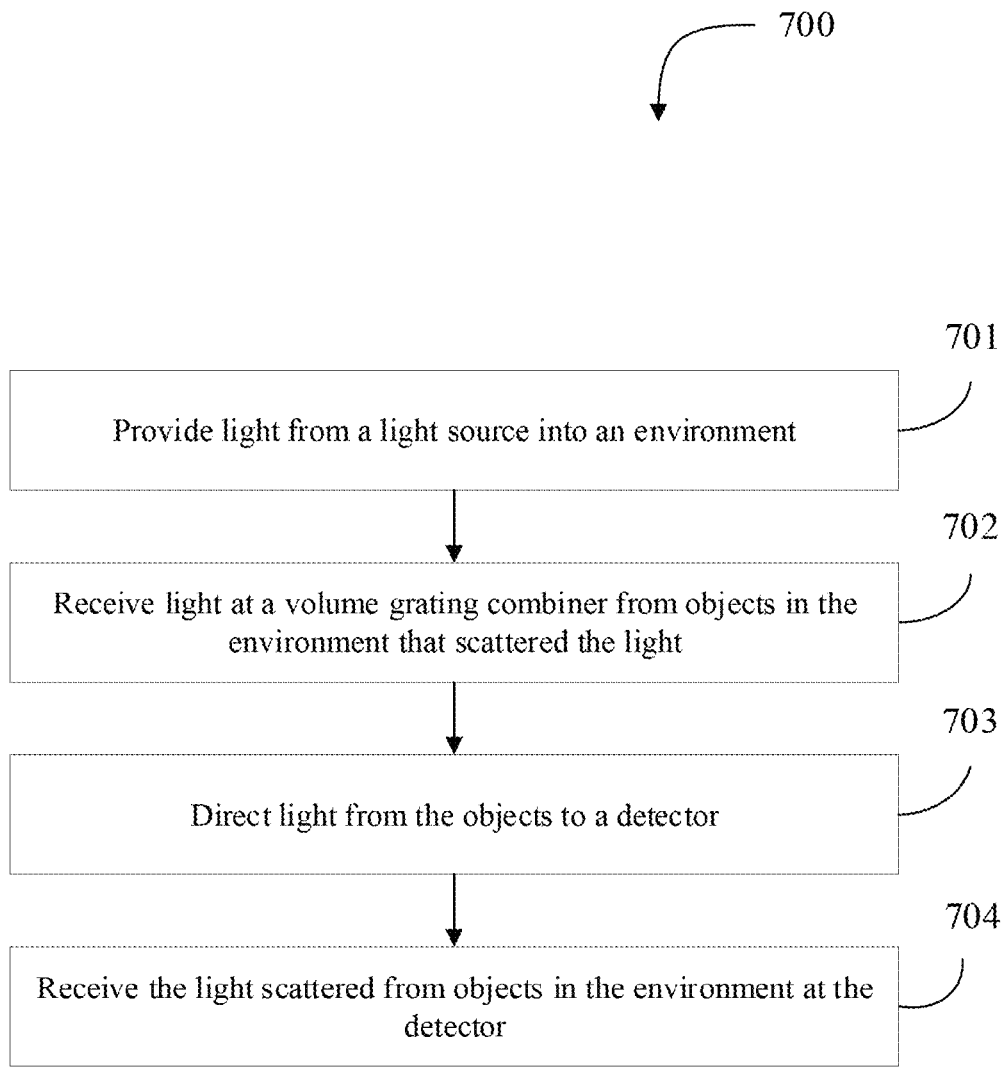
FIG. 7 depicts a method of eye tracking in accordance with an illustrative embodiment.

FIG. 7 depicts a method 700 of eye tracking in accordance with an illustrative embodiment. In an operation 701, light is provided into an environment via a light source. In some embodiments, the light source emits an infrared light at least into a field of view of the eye tracking system. In an operation 702, light from the light source is scattered and/or reflected from objects within the FOV of the eye tracking system to an optical element that includes volume gratings. In some embodiments, the light is scattered from a user's eye that is within the FOV of the system.

At operation 703, the optical element reflects the light scattered from the objects within the FOV to a detector. In some embodiments, the volume gratings throughout the optical element include spatially varying k-vectors. In some embodiments, the volume gratings include spatially varying k-vectors designed to increase the diffraction efficiency of light incident to the optical element over one or more portions of the FOV. In some embodiments, the volume gratings include spatially varying k-vectors that induce optical power on one or more portions of the FOV.

At operation 704, the detector receives the light reflected by the optical element (e.g., reflected by the volume gratings) and generates an electrical signal that is indicative of the received light. In some embodiments, the detector includes a local processor that generates and processes an image of the objects within the field of view. In some embodiments, the detector or local processor calculates the position of the objects within the field of view. In some embodiments, the detector or local processor calculates a gaze angle of an eye of a user within the FOV. In some embodiments, the detector or local processor transmits the electrical signal or image to another computing device via a communications interface.

Figure 8:
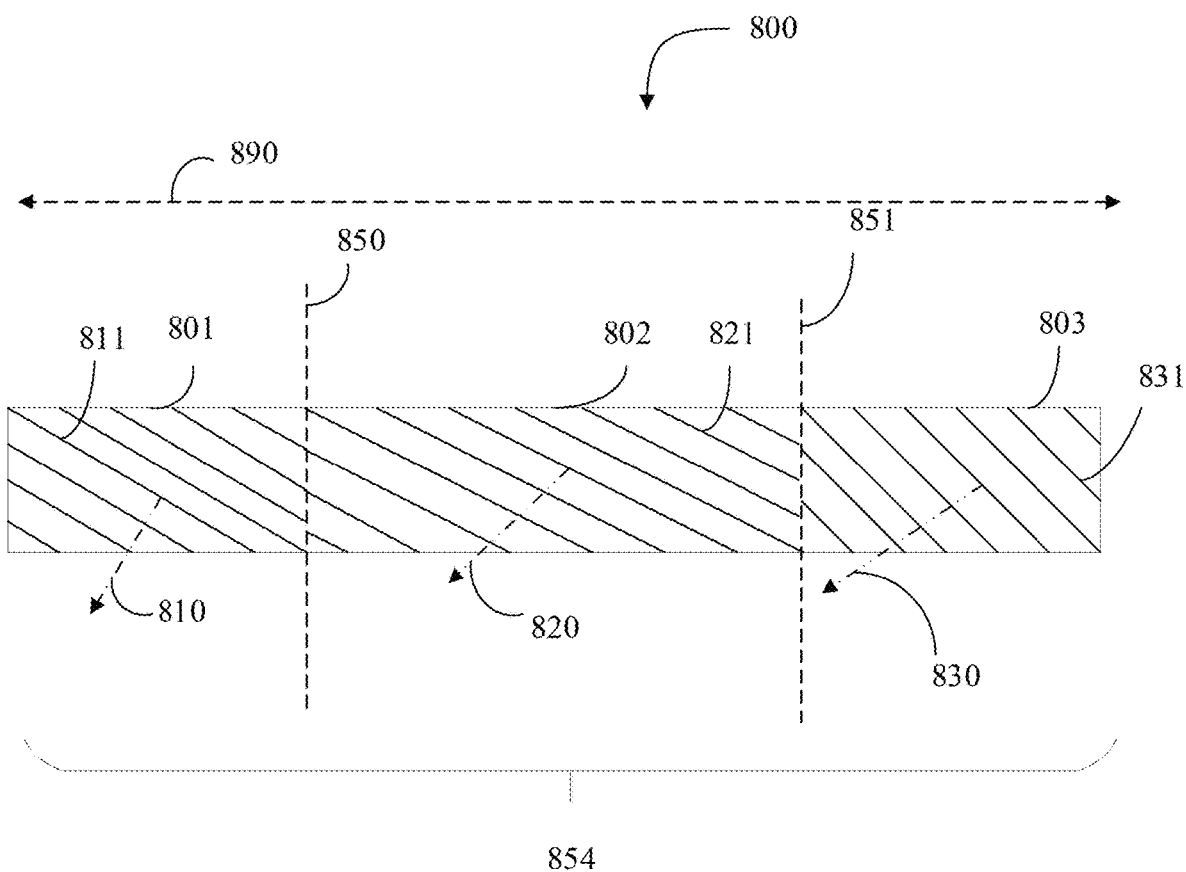
FIG. 8 depicts a top view of an example optical element that has spatially varying k-vectors in accordance with an illustrative embodiment.

FIG. 8 depicts a top view of an example optical element 800 that has spatially varying k-vectors in accordance with an illustrative embodiment. The optical element 800 includes a first portion 801, a second portion 802, and a third portion 803. The first portion 801 includes a first set of volume gratings 811 that have a first k-vector 810. The second portion 802 includes a second set of volume gratings 821 that have a second k-vector 820. The third portion 803 includes a third set of volume gratings 831 that have a third k-vector 830. The first, second, and third set of volume gratings 811, 821, 831 each are angled at a different slant angle relative to a first area 854 (e.g., first plane) of the optical element. The first, second, and third k-vectors 810, 820, and 830 are perpendicular to the respective volume gratings. The periodicity of each of the first, second, and third set of volume gratings 811, 821, and 831 may be selected based on the angle of the light incident, wavelength of the light incident, and the desired diffraction angle (e.g., a diffraction angle that will reflect the respective light portions to the detector) of the light incident in order to ensure that light from the FOV is reflected to the detector.

As indicated above, in this way, the first portion 801 has a first angular bandwidth that allows the first portion to reflect light received from a first portion of the field of view (FOV), the second portion 802 has a second angular bandwidth that allows the second portion 802 to reflect light received from a second portion of the FOV, and the third portion 803 has a third angular bandwidth that allows the third portion 803 to reflect light from a third portion of the FOV with a DE that allows for more accurate imaging. In some embodiments, the first portion 801 and the second portion 802 have a discrete end point at an axis 850. The second portion 802 and the third portion 803 have a discrete end point along a second axis 851. In some embodiments, the portions do not have discrete endpoints and the volume gratings (and thereby the k-vectors) continuously change along the first area of the optical element 800. That is, in some embodiments, the first area 854 has respective volume gratings that vary discretely in a piecemeal fashion along a first axis 890 (e.g., a length) of the optical element 800 such that each discrete portion has a different k-vector. In some embodiments, the first area 854 has respective volume gratings that vary discretely in a piecemeal fashion along the first axis 890 and a second axis (e.g., axis coming out from the page or a height) of the optical element 800 such that each discrete portion has a different k-vector. For example, the first area 854 may be a plane that has grid-like portions where each part of the grid has corresponding volume gratings that have different k-vectors. In some embodiments, the volume gratings of the optical element may vary constantly along the first axis 890 (and/or the second axis) such that the k-vectors vary continuously according to a function (e.g., a linear function or a function according to design parameters). For example, the k-vectors may vary continuously in accordance with the design parameters of a specific eye tracking system implementation such as the example design parameters indicated in FIG. 4. It is to be appreciated that FIG. 8 is meant by way of example only and that in some embodiments, the optical element 800 may include more or fewer discrete or continuous portions that have corresponding volume gratings and k-vectors.

Figure 9:
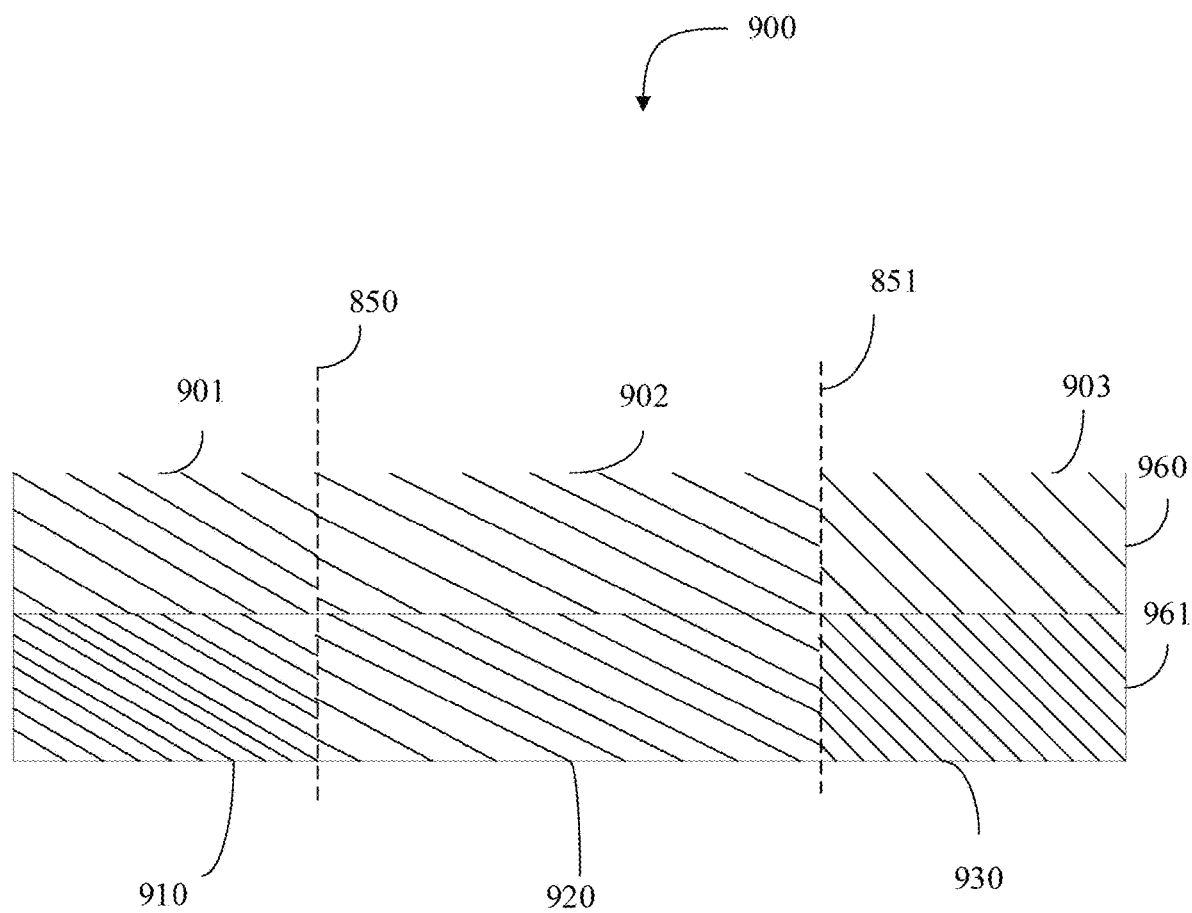
FIG. 9 depicts a top view of an optical element that includes two or more layers of diffraction gratings in accordance with an illustrative embodiment.

FIG. 9 depicts a top view of an optical element 900 that includes two or more layers of volume gratings (i.e., diffraction gratings or elements) in accordance with an illustrative embodiment. In some embodiments, the optical element 900 may include one or more layers of optical elements that each have their own set of volume gratings. The optical element 900 may include a first optical element 960 that includes a first portion 901, a second portion 902, and a third portion 903. The optical element 900 may also include a second optical element 961 that includes a first portion 910, a second portion 920, and a third portion 930. In some embodiments, the first, second, and third portions of the first optical element 960 and the first, second, and third portions of the second optical element 961 are aligned with one another. In some embodiments, the first, second, and third portions 901, 902, and 903 of the first optical element 960 have volume gratings with the same respective slant angles as volume gratings of the first, second, and third portions 910 of the second optical element 961. In some embodiments, the first optical element 960 has diffraction elements with a periodicity that allows for light at a first wavelength to be reflected to the detector with a diffraction efficiency of greater than 80% substantially over the FOV. Further, the diffraction elements of the second optical element 961 may allow for light at a second wavelength to be reflected to the detector with a diffraction efficiency greater than 80% substantially over the FOV. In this way, the detector may receive more than one colors or wavelengths of light in order to image objects within the FOV.

Figure 10:
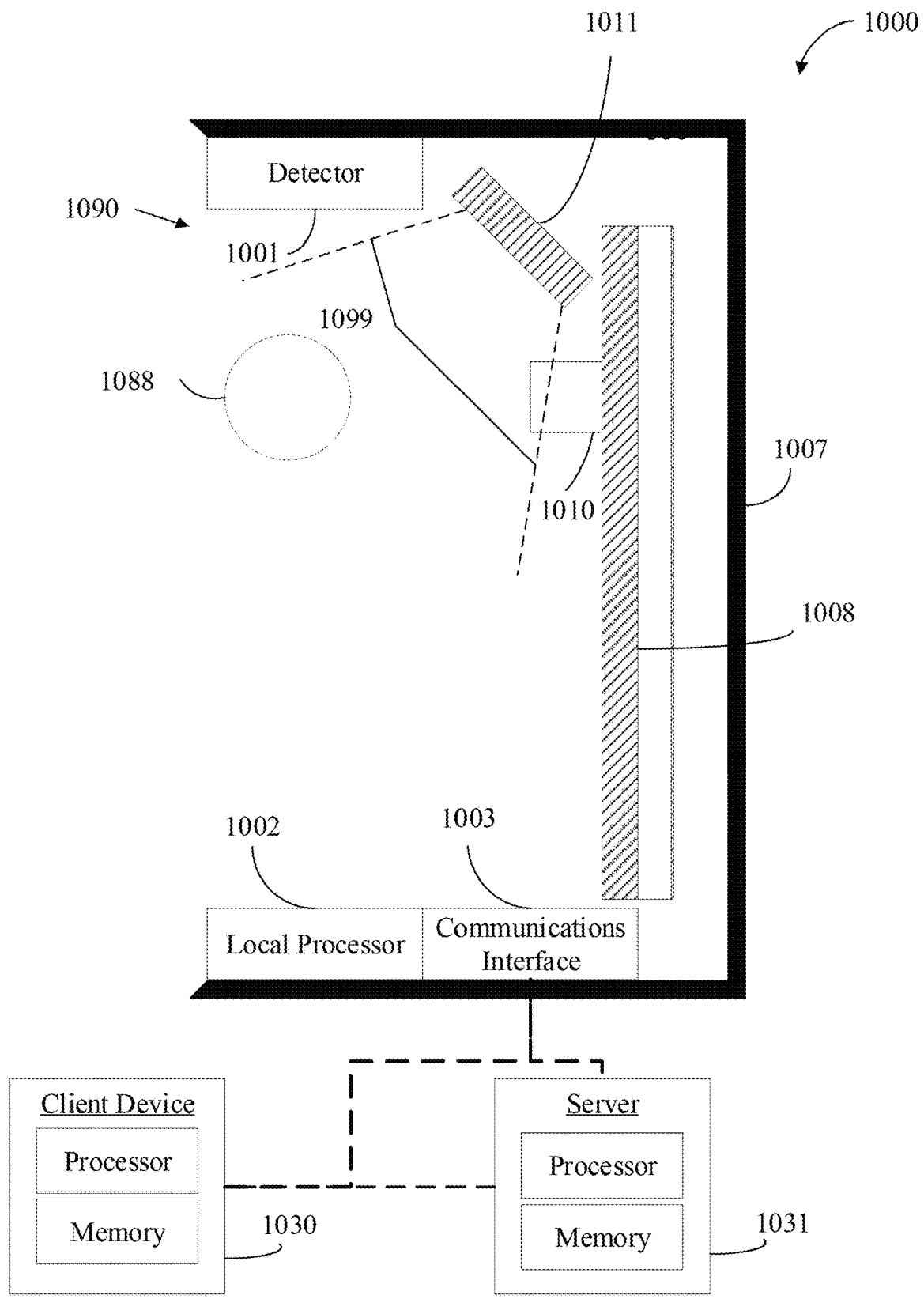
FIG. 10 depicts a schematic view of a head mountable device (HMD) in accordance with an illustrative embodiment.

FIG. 10 depicts a schematic view of a head wearable or mountable device (generally referred to as HMD) 1000 in accordance with an illustrative embodiment. In some embodiments, the HMD 1000 includes a housing 1007, a display 1008, a local processor 1002, a communications interface 1003, and an eye tracking system 1090. The eye tracking system 1090 may include a light source 1010, an optical element 1011, and a detector 1001. In some embodiments, the housing 1007 forms an eyebox of the wearable device. The eyebox may form an enclosure that is designed to fit to the head of a user and/or around the eyes of the user such that the vision of the user is restricted to elements (e.g., displays) within the eyebox or to elements outside of the eyebox via a lens or other window that allows for ambient light to enter the eyebox. In some embodiments, the eye tracking system 1090 may be any embodiments of the eye tracking systems described herein. In some embodiments, processing of the image detected by the detector is performed by the local processor 1002 in response to the detector 1001 received reflected light from the optical element 1011. The HMD 1000 may be connected to a local client device 1030 such as a personal computer, gaming counsel, or other computing device. The local client device 1030 may include a processor and a memory. In some embodiments, processing of the image detected by the detector is performed by the local client device 1030 in response to receiving information or data from the eye tracking system 1090 (e.g., the detector 1001) via the communications interface 1003. The HMD may also be connected to a server 1031 via a network connection. In some embodiments, processing of the image detected by the detector is performed by the server 1031 in response to receiving information or data from the eye tracking system (e.g., the detector 1001) via the communications interface 1003, network connection, or client device 1030.

The HMD 1000 may be mountable to a head of a user (e.g., a wearable device). The user's eye 1088 may then look at the display 1008. In some embodiments, the eye tracking system 1090 is "off-axis." That is, the optical element 1011 is displaced from an axis of the eye 1088 looking at the display 1008 such that the user's vision of the display 1008 is not impeded. The light source 1010 (mounted above or below the display 1008) may emit a light signal toward the eye 1088 and head of the user. The light signal may then scatter from each point that the light signal reaches an object (e.g., the eye, skin, hair, or other parts of the head). A portion of the light scattered from each point is then reflected to the optical element 1011. The portions of the light scattered will each have a different angle of incidents to the optical element 1011 depending on where the light was scattered from within a field of view (FOV) 1099 of the eye tracking system. The optical element 1011 includes volume gratings that have spatially varying k-vectors that may ensure that each point (or a selected portion or points based on the design of the volume gratings within the optical element 1011) of the user's eye and/or head is reflected to the detector with a diffraction efficiency above 80%. The light reflected from the optical element 1011 may then be received by the detector 1001 and processed for information regarding the objects (e.g., gaze angle of the user, position of the user's eye relative to the display, etc.). In some embodiments, other implementations of a wearable device may be integrated with an eye tracking system. For example, a wearable device may include glasses, goggles, or other devices attachable to a head of a user.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein.

For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A wearable device comprising:
   a light source configured to generate light and project the light into an eyebox of the wearable device; and
   a detector configured to receive a single bounce reflection of light from a volume grating on a medium, wherein the reflection is away from the medium, the volume grating configured to reflect the light from portions of the eyebox within a field of view to the detector, the volume grating comprising a plurality of portions along a longitudinal axis of a first area of the volume grating, each of the portions comprising a unique k-vector that is dependent on a respective portion of the field of view and a relative position of the detector such that the k-vector is closer to perpendicular with the longitudinal axis as a distance between the respective portion and the detector decreases.

2. The wearable device of claim 1, wherein the plurality of portions comprises a first portion having a first k-vector, a second portion having a second k-vector, and a third portion having a third k-vector, the second portion between the first portion and the third portion, the first portion between the detector and the second portion.

3. The wearable device of claim 2, wherein the first portion, the second portion, and the third portion each have a unique grating periodicity.

4. The wearable device of claim 2, wherein the first portion has a Bragg matching condition at a first incident angle of a first impinging light relative to the volume grating in the field of view, the second portion has a Bragg matching condition at a second incident angle of a second impinging light relative to the volume grating in the field of view, and the third portion has a Bragg matching condition at a third incident angle of a third impinging light relative to the volume grating in the field of view, wherein Bragg matching condition comprises a diffraction efficiency above eighty percent.

5. The wearable device of claim 4, wherein the first impinging light, second impinging light, and third impinging light are at substantially the same wavelength.

6. The wearable device of claim 5, wherein the first incident angle, the second incident angle, and the third incident angle have different magnitudes.

7. The wearable device of claim 1, wherein the k-vectors along the first area are designed to maximize a diffraction efficiency over the entire field of view.

8. The wearable device of claim 1, wherein the k-vectors along the first area are designed to reduce aberrations in images of elements within the field of view.

9. The wearable device of claim 1, wherein the k-vectors along the first area are designed to induce optical power in images of elements within the field of view.

10. The wearable device of claim 1, wherein the optical power is a magnification of an element in the field of view on the detector.

11. A system for eye tracking comprising:
    a light source configured to generate light and project the light toward an object in a field of view;
    a detector configured to receive reflected portions of the light from the field of view in order to image the object;
    a volume grating configured to reflect impinging light reflected from different points in a field of view to the detector, the volume grating comprising a plurality of portions along a first area having a longitudinal axis, each of the portions comprising a unique k-vector that is dependent on a respective portion of the field of view and a relative position of the detector such that the k-vector is closer to perpendicular with the longitudinal axis as a distance between the respective portion and the detector decreases, wherein a path from the volume grating to the detector does not utilize total internal reflection in a medium associated with the grating.

12. The system of claim 11, wherein a first portion along the first area of the volume grating comprises a first k-vector, a second portion along the first area of the volume grating comprises a second k-vector, and a third portion along the first area of the volume grating comprises a third k-vector.

13. The system of claim 12, wherein the first portion of the volume grating has a Bragg matching condition at a first incident angle of a first impinging light relative to the volume grating in the field of view, the second portion of the volume grating has a Bragg matching condition at a second incident angle of a second impinging light relative to the volume grating in the field of view, and the third portion of the volume grating has a Bragg matching condition at a third incident angle of a third impinging light relative to the volume grating in the field of view.

14. The system of claim 13, wherein the first impinging light, second impinging light, and third impinging light are at substantially the same wavelength.

15. A reflective volume grating, the reflective volume grating being for use in an eye tracking system, the reflective volume grating comprising:
    a plurality of grating elements along a longitudinal axis, the plurality of grating elements having a plurality of k-vectors along a first area, wherein each of the plurality of k-vectors along the first area are dependent on a respective portion of a field of view and a relative position of a detector such that the k-vector is closer to perpendicular with the longitudinal axis as a distance between the respective portion and the detector decreases and light reflected off an object at different points of the object in the field of view impinges the reflective volume grating and is directly reflected to the detector with a diffraction efficiency above eighty percent.

16. The reflective volume grating of claim 15, wherein a first portion along the first area of the reflective volume grating comprises a first k-vector, a second portion along the first area of the reflective volume grating comprises a second k-vector, and a third portion along the first area of the reflective volume grating comprises a third k-vector.

17. The reflective volume grating of claim 16, wherein the first portion, the second portion, and the third portion each have a unique refractive index.

18. The reflective volume grating of claim 15, further comprising photopolymer, dichromated gelatin, silver halide, photorefractive crystal, or photoresist materials.

19. The reflective volume grating of claim 15, wherein the first area is polarized.

20. The wearable device of claim 1, wherein the detector is positioned to receive the light reflected from the volume grating via a direct path from the volume grating to the detector.

* * * * *